United States Patent
Hoffmann et al.

[11] Patent Number: 6,081,062
[45] Date of Patent: Jun. 27, 2000

[54] METHOD AND DEVICE FOR DRIVING AT LEAST ONE CAPACITIVE ACTUATOR

[75] Inventors: Christian Hoffmann, Regensburg; Hellmut Freudenberg, Grossberg; Hartmut Gerken, Nittendorf; Martin Hecker, Laimerstadt; Richard Pirkl, Regensburg, all of Germany

[73] Assignee: Siemens Aktiengesellschaft, Munich, Germany

[21] Appl. No.: 09/335,564

[22] Filed: Jun. 18, 1999

Related U.S. Application Data

[63] Continuation of application No. PCT/DE97/02905, Dec. 12, 1997.

[30] Foreign Application Priority Data

Dec. 18, 1996 [DE] Germany .......................... 196 52 809

[51] Int. Cl.⁷ .................................................. H01L 41/04
[52] U.S. Cl. ....................................................... 310/316.03
[58] Field of Search .......................................... 310/316.03

[56] References Cited

U.S. PATENT DOCUMENTS

| | | | |
|---|---|---|---|
| 4,732,129 | 3/1988 | Takigawa et al. | 123/478 |
| 5,130,598 | 7/1992 | Verheyen et al. | 310/316.03 |
| 5,208,505 | 5/1993 | Mitsuyasu | 310/317 |

FOREIGN PATENT DOCUMENTS

412984A1  1/1992  Germany .......................... H02N 2/00

OTHER PUBLICATIONS

Japanese Patent Abstract No. 61271881 (Masahiro), dated Dec. 2, 1986.

*Primary Examiner*—Thomas M. Dougherty
*Attorney, Agent, or Firm*—Herbert L. Lerner; Laurence A. Greenberg; Werner H. Stemer

[57] ABSTRACT

In a driving operation, a capacitive actuator is charged from a series circuit of two capacitors having a charging voltage. An actuator voltage established at the actuator is controlled to a prescribed desired value in a course of a subsequent driving operation; the same procedure occurs for further actuators.

8 Claims, 3 Drawing Sheets

METHOD AND DEVICE FOR DRIVING AT LEAST ONE CAPACITIVE ACTUATOR

CROSS-REFERENCE TO RELATED APPLICATION

This application is a continuation of copending International Application No. PCT/DE97/02905, filed Dec. 12, 1997, which designated the United States.

BACKGROUND OF THE INVENTION

Field of the Invention

The invention relates to a method and a device for driving at least one capacitive actuator, in particular a piezoelectrically operated fuel injection valve of an internal combustion engine.

Piezoelectric actuators contain a multiplicity of piezoceramic layers, and form a so-called stack, which upon the application of a voltage changes its dimensions, in particular its length s by a deviation ds, or generates an electric voltage in the event of a mechanical compression or tension.

Published, Non-Prosecuted German Patent Application DE 41 22 984 A1 discloses a driving device for a piezoelectric element in which the driving of the piezoelectric element is performed via corresponding electronic switches having prescribed charging and discharging times.

Published, Non-Prosecuted German Patent Application 196 32 872.1 A, corresponding to U.S. patent application Ser. No. 09/250,875, filed on Feb. 16, 1999, has already proposed a method for driving a capacitive actuator, in accordance with which the actuator is charged with a prescribed charging voltage until the voltage measured at the actuator during the driving operation reaches a prescribed value.

SUMMARY OF THE INVENTION

It is accordingly an object of the invention to provide a method and a device for driving at least one capacitive actuator which overcomes the above-mentioned disadvantages of the prior art methods and devices of this general type, in which a method of voltage control during driving of at least one capacitive actuator is possible even when it is impossible to break off the charging operation during driving.

With the foregoing and other objects in view there is provided, in accordance with the invention, a method for driving at least one capacitive actuator, including a piezoelectrically operated fuel injection valve of an internal combustion engine, which contains:

charging, at a start of a driving operation, an actuator of a plurality of actuators with a prescribable charging voltage via a coil from a series circuit composed of a charging capacitor and a charge-reversing capacitor, and discharging the actuator into the charge-reversing capacitor at an end of the driving operation;

comparing an actuator voltage of the actuator due to the prescribable charging voltage with a prescribed desired-value voltage;

determining a new charging voltage for a next driving operation in dependence on a difference between the prescribed desired-value voltage and the actuator voltage; and charging the charging capacitor for the next driving operation to a voltage corresponding to a difference between the new charging voltage and a voltage present across the charge-reversing capacitor.

With the foregoing and other objects in view there is further provided, in accordance with the invention, a device for driving at least one capacitive actuator, including:

a voltage source having a positive pole and a negative pole;

a charging capacitor disposed between the positive pole and the negative pole;

a control circuit controlling the voltage source;

a first series circuit disposed parallel to the charging capacitor and containing a charging switch connected to the positive pole for conducting current away from the positive pole and a discharging switch connected to the negative pole for conducting current toward the negative pole;

a ground terminal;

a second series circuit disposed between a connection point of the charging switch and the discharging switch and the ground terminal, the second series circuit containing a charge reversing capacitor having a recharge voltage connected to the charging switch and a coil;

at least one third series circuit connected in series with the second series circuit and containing an actuator having an actuator voltage and a controlled Power-MOSFET-switch; and a diode disposed parallel to the at least one third series circuit and conducting from the ground terminal to the coil.

Other features which are considered as characteristic for the invention are set forth in the appended claims.

Although the invention is illustrated and described herein as embodied in a method and a device for driving at least one capacitive actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
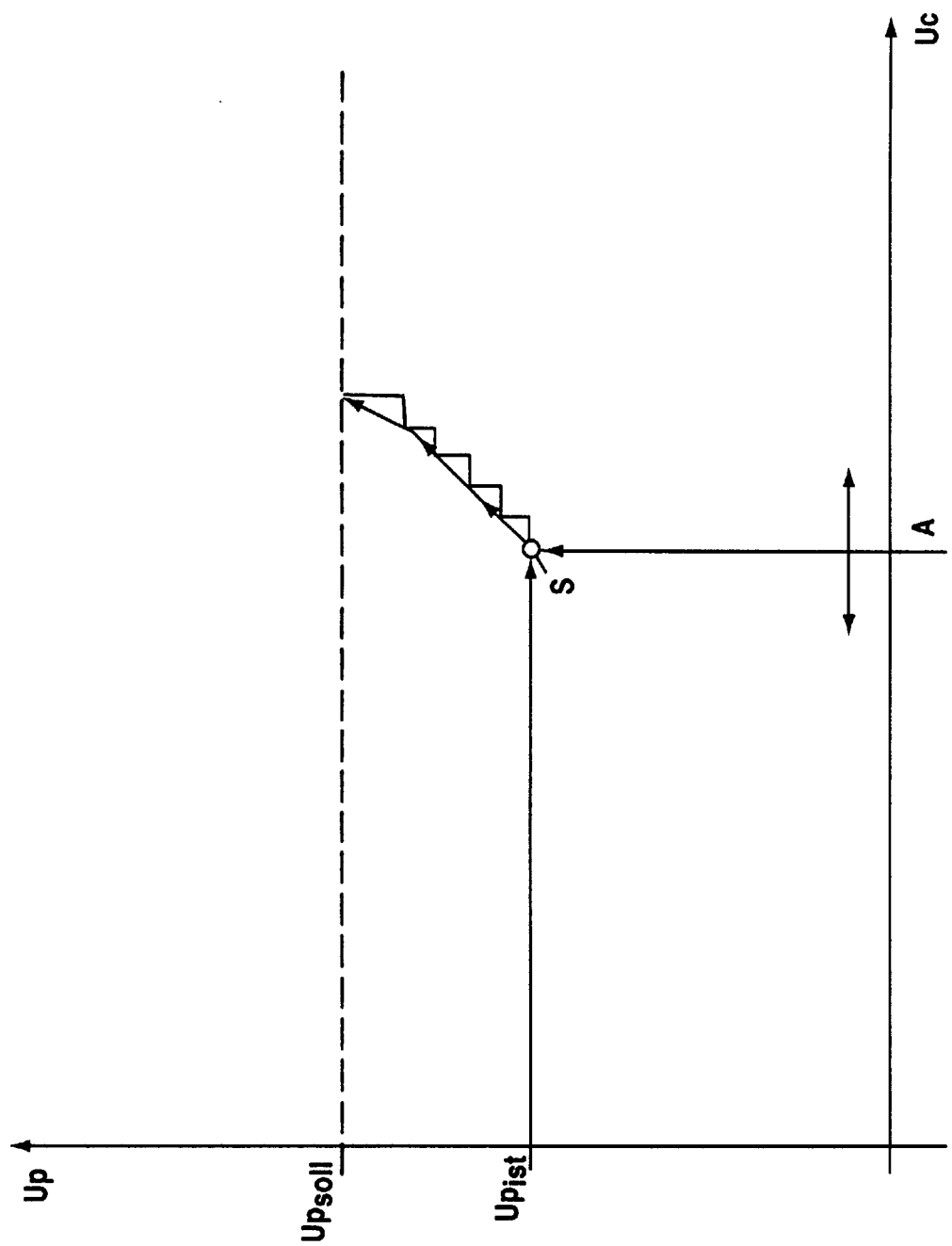
FIG. 1 is a graph of an actuator voltage Up plotted against a charging voltage Uc according to the invention.

The invention proceeds from the consideration that what is involved, as a rule, is temperature-induced variations which have a very large time constant compared with the temporal timing of successive actuator operations in an internal combustion engine, or manufacturing tolerances which do not change. There is therefore no need to carry out a control or regulation of the recharging in an actual control cycle (driving operation), it sufficing completely, instead, to determine a deviation in a driving operation and then to correct it in a subsequent driving operation.

In all the figures of the drawing, sub-features and integral parts that correspond to one another bear the same reference symbol in each case. Referring now to the figures of the drawing in detail and first, particularly, to FIG. 1 thereof, there is shown a diagram of the relationship between a charging voltage Uc and an actuator voltage Up, a prescribed actuator desired value $Up_{soll}$ being illustrated by a dashed line. The method according to the invention is described below with the aid of this diagram and of a circuit, represented in FIG. 2, of a driving device for a plurality of capacitive actuators.

The driving of n fuel injection valves (not represented below) of an internal combustion engine via piezoelectric actuators P1 to Pn is performed by a control circuit ST which is part of a microprocessor-controlled engine control unit.

Figure 2:
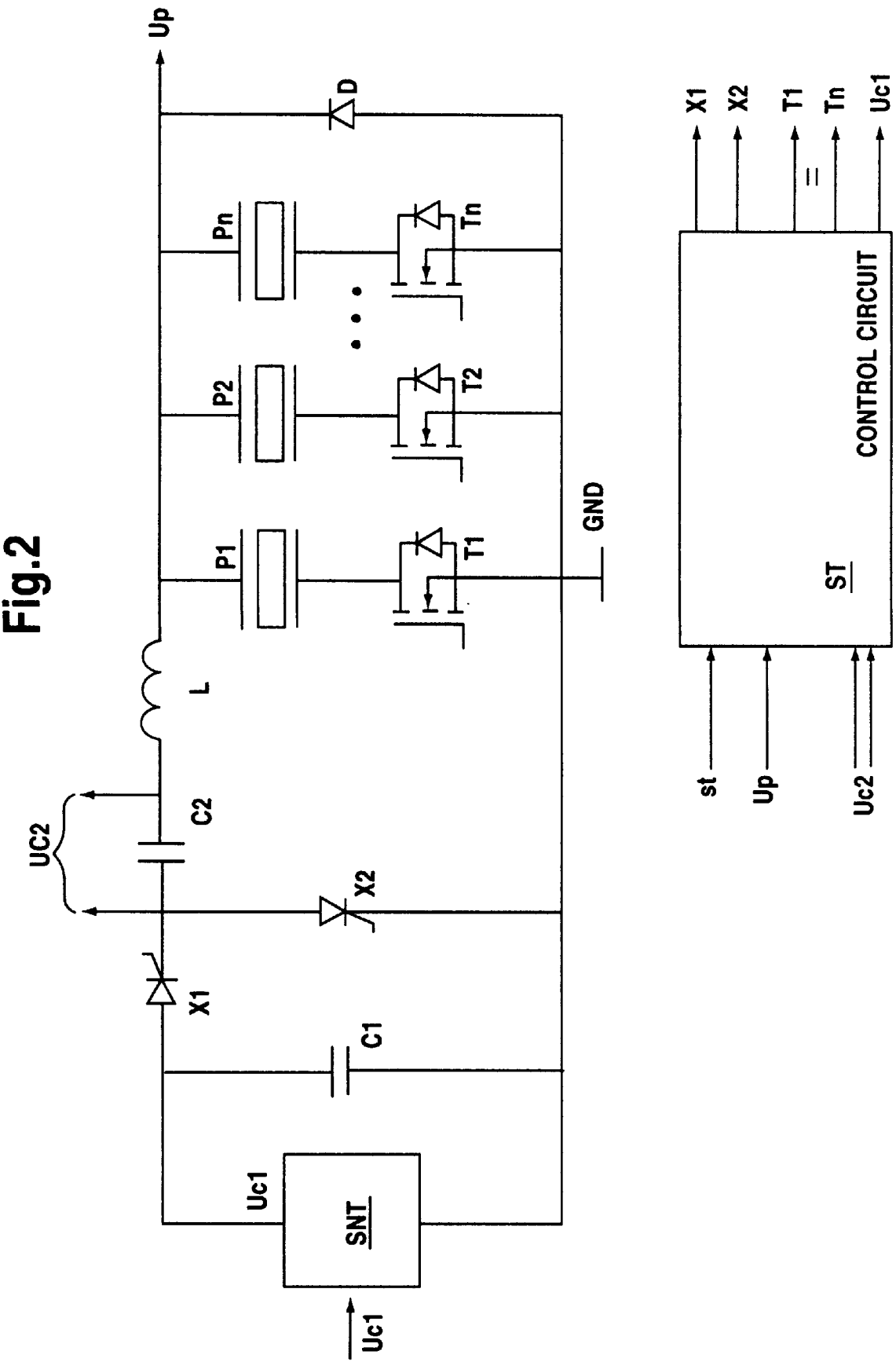
FIG. 2 is a diagrammatic, circuit block diagram of a device for driving a plurality of actuators.

As shown in FIG. 2, there is connected between a positive pole and a negative pole GND of a controllable voltage source SNT, preferably of a switched-mode power supply SNT, a charging capacitor C1. The charging capacitor C1 can be regarded as an output capacitor of the switched-mode power supply SNT and is charged up to an output voltage Uc1 thereof. Disposed in parallel with the charging capacitor C1 is a series circuit composed of a charging switch X1, which is connected to the positive pole and passes current away from it, and a discharging switch X2, which is connected to the negative pole GND and passes current toward it.

The switches X1 and X2 are electronic switches, preferably thyristor switches, which pass current only in one direction, contain at least one semiconductor element and are turned on by the control circuit ST.

Situated between the connection point of the charging switch X1 and the discharging switch X2 and a frame terminal GND is a series circuit composed of a charge-reversing capacitor C2, a ring-around coil L, a first actuator P1 and a first, controlled power MOSFET switch T1.

For each further actuator, a series circuit composed of an actuator P2 to Pn and a further power MOSFET switch T2 to Tn is connected in parallel with the series circuit composed of the first actuator P1 and the first power MOSFET switch T1.

Disposed in parallel with the series circuits composed of the actuator P1–Pn and the power MOSFET switch T1–Tn is a diode D which passes current away from the frame terminal GND toward the ring-around coil L. Power MOSFET switches usually include inverse diodes whose function, as explained in more detail further below, are employed in operating the device according to the invention.

The switches X1, X2 and T1 to Tn are controlled by the control circuit ST in accordance with a program, assigned to the method according to the invention, as a function of control signals st of the engine control unit, of the actuator voltage Up and of a voltage Uc2 present across the charge-reversing capacitor C2 after discharging of the actuator P1–Pn.

Figure 3:
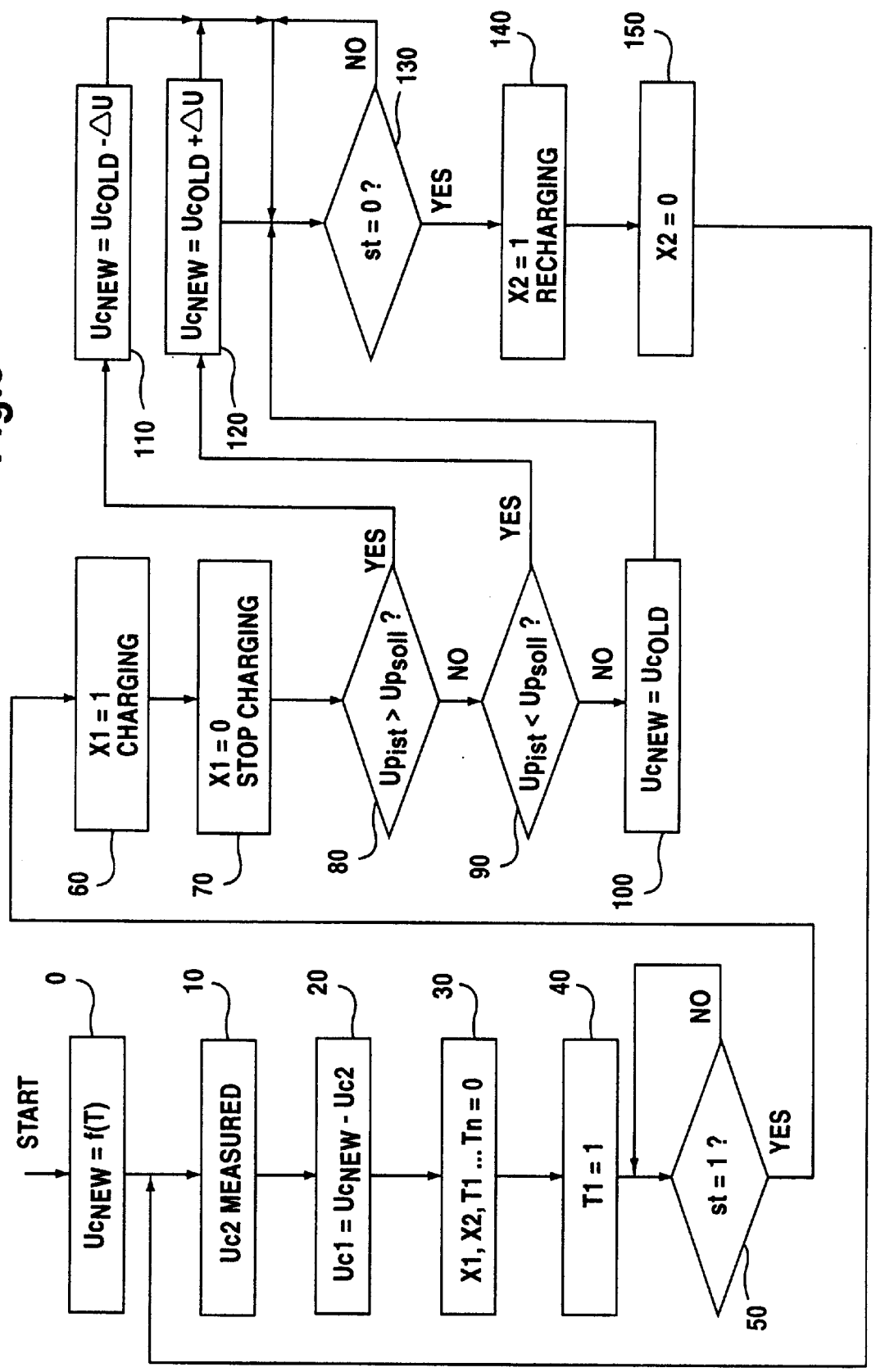
FIG. 3 is a flowchart relating to a mode of operation of the circuit according to FIG. 2.

The method according to the invention for successively driving the plurality of capacitive actuators P1–Pn is explained in more detail below for the actuator P1 with the aid of the flowchart represented in FIG. 3 on the basis of the circuit shown in FIG. 2. The individual boxes, assigned to the respective method states, are marked by reference numerals.

The charging voltage Uc (=Uc1+Uc2) is prescribed an initial value A (state 0) in the first driving operation when the vehicle is started. The value of the charging voltage Uc can be a function of an engine temperature: Uc=f(T), since the actuator capacitance can vary by a factor 2 in the engine temperature range.

In the case of a first driving operation, the charge-reversing capacitor C2 is discharged, Uc2=0V (state 10). Consequently, the output voltage of the controllable voltage source SNT is set to the voltage Uc1=Uc (initial value A) (state 20).

In a state 30, in which the ring-around coil L is deenergized, all of the switches X1, X2 and T1 to Tn are turned off (of high resistance), and all the actuators P1 to Pn are discharged. The aim is to operate the actuator P1 in order to inject fuel into the cylinder via the assigned injection valve. Firstly, the control circuit directs the corresponding actuator P1, for example, (state 40) by turning on the power MOSFET switch T1 assigned to it. T1 can remain turned on (of low resistance) via a crank shaft angle KW=720° KW/Z (Z=number of cylinders), that is to say, for example, 180° KW for four-cylinder engines and 120° KW for six-cylinder engines.

At the start of injection, which is prescribed by the control signal st=1 (state 50), the charging switch X1 is triggered by the control circuit ST (state 60). Consequently, the charging voltage Uc present on the series circuit composed of the capacitors C1 and C2 is discharged during a completely sinusoidal half oscillation via the ring-around coil L into the actuator P1, and the latter opens the non-illustrated injection valve. The voltage source, i.e. the switched-mode power supply SNT, remains connected to the charging capacitor C1, with the result that it also feeds energy into the resonant circuit.

After the charging process, the charging switch X1 is automatically switched off (state 70), and the actuator P1 is charged to an actuator voltage $Up_{ist}$. The result in FIG. 1 is a point of intersection S of the charging voltage Uc and the actuator voltage $Up_{ist}$.

The actual value of the actuator voltage $Up_{ist}$, established at the actuator P1 at an end of the charging cycle, is communicated to the control circuit ST which compares it with a prescribed desired value $Up_{soll}$ illustrated by the dashed line in FIG. 1 (states 80 and 90).

If the actual value $Up_{ist}$ is greater than the desired value $Up_{soll}$ (state 80), a new value is determined for the charging voltage Uc: $Uc_{new}=Uc_{old}-DU$ (state 110) is determined for the next driving operation of the actuator P1. A lower actuator voltage $Up_{ist}$ is then set thereupon in the next driving operation. If the actual value $Up_{ist}$ is, however, less than the desired value $Up_{soll}$ (state 90), a larger, new value for the charging voltage Uc: $Uc_{new}=Uc_{old}+DU$ (state 120) is determined for the next driving operation. If the value $Up_{ist}$ is equal to the desired value $Up_{soll}$ (state 100), the charging voltage Uc remains unchanged at the next driving operation of the actuator P1. As described and indicated by arrows in FIG. 1, the process of approximation to the desired value can be performed incrementally by prescribed steps DU, or according to any desired process of approximation.

The discharging switch X2 is fired (state 140) in order to discharge the actuator P1 at the end (removal) of the control signal st (state 130). The discharging circuit is closed via the inverse diode of the power MOSFET switch T1. The energy stored in the actuator P conducts back via the ring-around coil L into the charge-reversing capacitor C2; the energy stored in it can be used for the next driving operation.

As soon as the actuator P1 is discharged to the threshold voltage of the diode D connected in parallel to the "active" channel, the current still flowing is continued via the diode, thereby preventing the actuator P1 from being charged to a negative voltage. The discharging switch X2 is subsequently automatically switched off (state 150).

For the next driving operation of the actuator P1, the charging capacitor C1 must be recharged to a voltage Uc1=Uc−Uc2, for which purpose Uc2 is measured (state 10). It is thereby possible to determine Uc1=Uc−Uc2 (state 20). The switched-mode power supply SNT is set to this value for the next driving operation of the actuator P1, and the charging capacitor C1 is thereby charged to Uc1. The values determined in this driving operation are used to carry out the next driving operation, from state 30. The driving operations for the other actuators P2 to Pn correspond to the method described for the actuator P1.

We claim:

1. A method for driving at least one capacitive actuator, including a piezoelectrically operated fuel injection valve of an internal combustion engine, which comprises:

charging, at a start of a driving operation, an actuator of a plurality of actuators with a prescribable charging voltage via a coil from a series circuit composed of a charging capacitor and a charge-reversing capacitor, and discharging the actuator into the charge-reversing capacitor at an end of the driving operation;

comparing an actuator voltage of the actuator due to the prescribable charging voltage with a prescribed desired-value voltage;

determining a new charging voltage for a next driving operation in dependence on a difference between the prescribed desired-value voltage and the actuator voltage; and charging the charging capacitor for the next driving operation to a voltage corresponding to a difference between the new charging voltage and a voltage present across the charge-reversing capacitor.

2. The method according to claim 1, which comprises setting at a start of the driving operation a prescribed value for the prescribable charging voltage for each of the plurality of actuators.

3. The method according to claim 2, which comprises setting the prescribed value for the prescribable charging voltage in dependence on an engine temperature.

4. A device for driving at least one capacitive actuator, comprising:

a voltage source having a positive pole and a negative pole;

a charging capacitor disposed between said positive pole and said negative pole;

a control circuit controlling said voltage source;

a first series circuit disposed parallel to said charging capacitor and containing a charging switch connected to said positive pole for conducting current away from said positive pole and a discharging switch connected to said negative pole for conducting current toward said negative pole;

a ground terminal;

a second series circuit disposed between a connection point of said charging switch and said discharging switch and said ground terminal, said second series circuit containing a charge reversing capacitor having a recharge voltage connected to said charging switch and a coil;

at least one third series circuit connected in series with said second series circuit and containing an actuator having an actuator voltage and a controlled Power-MOSFET-switch; and a diode disposed parallel to said at least one third series circuit and conducting from said ground terminal to said coil.

5. The device according to claim 4, wherein said voltage source is a switched-mode power supply.

6. The device according to claim 4, wherein said control circuit is a part of a microprocessor-controlled engine control unit, said control circuit being fed as input variables control signals for driving said actuator, said actuator voltage present at a respectively driven actuator and said recharge voltage present across said charge-reversing capacitor, said control circuit further controlling said charging switch, said discharging switch and said Power-MOSFET-switch for charging and discharging said actuator.

7. The device according to claim 4, wherein said charging switch and said discharging switch are electronic semiconductor switches passing current only in one direction.

8. The device according to claim 4, wherein said at least one third series circuit is a plurality of third series circuits disposed parallel to each other and all in series with said second series circuit.

* * * * *